United States Patent Office 3,091,093
Patented May 28, 1963

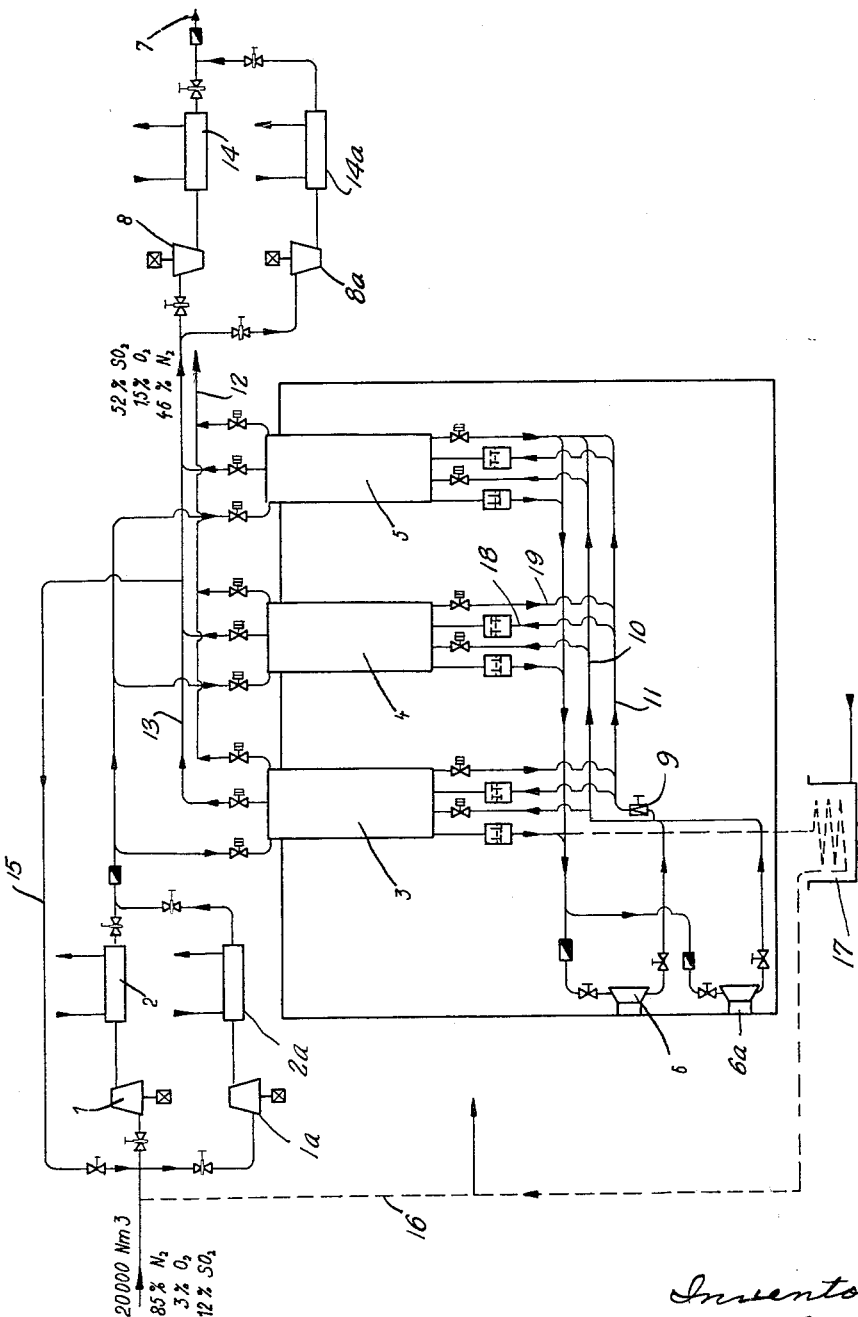

3,091,093
PROCESS FOR THE OPERATION OF REGENERATORS, PREFERABLY FOR USE IN THE LOW-TEMPERATURE RANGE
Rudolf Becker, Munich-Solln, Germany, assignor to Gesellschaft für Linde's Eismaschinen Aktiengesellschaft, Hollriegelskreuth, near Munich, Germany, a German company
Filed June 16, 1958, Ser. No. 742,378
Claims priority, application Germany June 22, 1957
3 Claims. (Cl. 62—12)

The present invention relates to the art of separating gases by fractional liquefaction at low temperatures, and is concerned with an improved technique for cleansing regenerators, i.e. ridding them of their contents of condensed foreign constituents, preparatory to their re-use.

In the operation of regenerators, for example for deep freezing gas mixtures to be separated, it is known that it amounts to a great problem to liberate the regenerators again, effectively and with as low as possible expenditures, from condensed foreign constituents and to cool the regenerators to the low temperature required for the ensuing process. For scavenging the regenerator, to remove therefrom condensed constituents, e.g., $CO_2$, by sublimation, it heretofore has been proposed to use for this purpose a portion of the crude gas which has been precooled in the regenerator and freed from such of its impurities as can be condensed out at above the gas separation temperature. As was shown, for example, in German Patent No. 845,958, scavenging gas with 1.4 times the volume of the crude gas has, up to now, been required in order to insure the removal of constituents which are condensed out of said crude gas in a regenerator by a mean temperature difference of 2° C. between the temperature of the crude gas exiting the regenerator to be cooled and cleaned and the temperature of the scavenging gas entering the regenerator to be warmed. On the other hand, it has been suggested, in the same patent, that it may be sufficient under certain special circumstances to work with a volumetric ratio between scavenging and crude gas, hereafter called "sublimation ratio" for short, of not more than 1.5. In this case it was assumed that, in addition to a residual gas separated from the crude gas, the regenerator would be scavenged also, at certain intervals, with a special scavenging gas which preferably should have the same temperature as that of the residual gas; the volumetric ratio used according to the above findings was between 1.4 and 1.5 in the above-mentioned favorable cases. But if such an additional scavenging is not used, and the regenerator is traversed only in the usual manner alternately by crude gas and a regenerating gas taken either from the separation apparatus or from any other source, the volumetric ratios used were generally 1.7 and even higher, in order to make sure that the regenerator was sufficiently freed from the deposits accruing during the loading period.

The underlying object of the present invention consists in reducing the amount of scavenging gas necessary for cleansing the regenerator. This is a very important consideration in those cases where there are no additional amounts of scavenging gas available and the impellents obtained in the fractionation have to be used, or when it is necessary to concentrate certain valuable constituents separated in the regenerator.

The investigations underlying the present invention have shown that the above mentioned opinion of the technical experts, namely, that it is necessary to work with a sublimation ratio of at least 1.4 in the cleansing of regenerators, must have been based on data which were valid only for regenerators having comparatively small heat transfer surfaces, and therefore showing a comparatively high temperature difference of at least about 2° C. in the range of the principal condensation.

According to the present invention, it is possible to work with a substantially lower sublimation ratio, namely, with a ratio of 0.8 to 1.4, provided the regenerators used in the gas separating plants are so selected that the temperature difference in the range of the condensations, particularly on the basis of correspondingly great heat transfer coefficients and heat contact surfaces, is less than 1–2° C. It has been discovered surprisingly that this is particularly possible in plants (a) for the separation of air and synthetic gases, for example, cokeoven gas, for the production of ethylene, and in plants (b) for the preparation of roast gases for the production of sulfurous acid, provided regenerators with sufficiently great heat transfer coefficients and heat contact surfaces according to the invention are used, and these regenerators are cleansed at a sublimation ratio of 0.8 to 1.4. The most favorable relationships are obtained with a sublimation ratio of about 1.2, with tolerances up to about 1.0 and 1.35. The measures for obtaining the desired heat transfer values in the regenerator are per se known from, for example, German Patents, Nos. 729,109 and 849,563. The construction and calculation of the known regenerators, however, was carried out from a distinctly different viewpoint, viz, in order to obtain optimum reversing frequencies and an economic ratio between production and operation of the regenerators.

The reduction of the amount of scavenging gas by the application of a sublimation ratio of between 0.8 and 1.4, according to the invention, has not only the advantage of lower gas losses and possible energy savings, but it leads also additionally to a higher concentration of separated substances or substances to be obtained. The latter advantage is particularly important in situations wherein not only impurities but also valuable substances are separated in the regenerators, which impurities and valuable substances have to be removed again, and, if necessary, concentrated, from the regenerators by means of the scavenging gas.

The invention will now be described in greater detail and with reference to the accompanying drawing, in which the single FIGURE is a diagrammatic representation of a gas separation apparatus operable for use in the carrying out of the improved process of the present invention.

*Example*

A roast gas dried with sulfuric acid and freed from dust and $SO_3$ and containing about 5 to 10% $SO_2$, is brought by means of turbo blower, 1, to a pressure of about 1.6 atm. After preliminary cooling in a water cooler 2, the roast gas is cooled in regenerator 3, which is reversed in a three-cycle rhythm by a pneumatic control to about −130° C., thereby the $SO_2$ contained in the roast gas is deposited partly in liquid and partly in solid form on the surfaces of the filling mass of the regenerator.

This roast gas, thus cleaned, is thereafter led to expansion turbine 6 and there decompressed to a working pressure of about 1.1 atmospheres. The purified and decompressed gas is thereafter separated into two unequal streams. The very much larger stream of gas flows through regenerator 5 in pipe 10 and leaves the apparatus through pipe 12. The smaller stream, only, of gas is expanded in throttle valve 9 to a pressure of some 0.2 atm. and flows into regenerator 4 in pipe 11. In regenerator 4 this stream overtakes the $SO_2$ deposit separated in the previous period. The stream, now enriched by a content of 50% $SO_2$, is propelled out of regenerator 4 through pipe 13, by means of vacuum pump 8, and drawn over cooler 14 through pipe 7 of the apparatus. The suction volume of the vacuum pump 8 amounts to about 1.2 times the volume of the roast gas upon its entrance into regenerator 3.

Regenerators 3, 4 and 5, through compressed-air steering of the valve are so controlled as to operate each in a consecutive phase of the cycle, so that in the course of three consecutive operating periods each regenerator in turn serves to separate the $SO_2$ from the roast gas, then to transfer the $SO_2$ deposits to the smaller flow of the gas expanded in the expansion machine 6, under vacuum, and finally to re-cool the larger flow of the gas decompressed in the decompression machine 6. Regenerators 3, 4 and 5 have dimensions so large that on any part of the regenerator storage masses there will be no greater temperature differential between the heat-exchanging gases than two degrees C.

The machines and heat-exchangers 1, 2, 6, 8 and 14, in case of emergency, respectively are substituted for, through parallel connected, controlled machines and heat-exchangers 1a, 2a, 6a, 8a and 14a, whereby a breakdown in one of the corresponding parts does not mean an interruption of operations while the defective part is being repaired.

Pipes 15 and 16 are not critical as regards the essentials of the operation of the process. In a case where the apparatus is to be set in motion with still-warm regenerators, the apparatus can be so controlled—with the help of pipe 15—that the cold produced in decompression machine 6 for cooling the regenerators will suffice as an operating temperature. When, on the other hand, it is necessary to stop the apparatus as quickly as possible, then pipe 16 and heating element 17 allow the apparatus to warm to room temperature. Finally, it should be mentioned that pipe 19 comes into use when a pressure equalization among the regenerators must be attained during operation. These last-named parts 15, 16, 17 and 19 are not unconditionally necessary for the immediate operation of the described process and represent a feature of the process commonly known in the art.

It should be noted that complete impurity removal does not occur during the second phase (that is to say, the first purification stage) of the process. This circumstance is explainable as follows:

During the first purification stage the greater part of the high-boiling impurities is to be removed from the regenerator, and this step is to be accomplished with a minimum supply of washing gas. This can be accomplished only if during the first purification stage, the regenerator is subjected to a pressure which is much lower than the pressure obtaining during the first work phase of the process. It is the most practical solution to produce, during the first purification stage a moderate negative pressure within the regenerator, which can be maintained easily without excessive engineering efforts, and to maintain a vortex gas flow by use of small quantities of washing gas. If a high vacuum were employed it would be possible to eliminate completely the high-boiling impurities, which are deposited in the regenerator during the first purification stage, but the generation of such high vacuum within the regenerator during this first purification stage would require an excessive outlay of machinery and expenditure. In case of a moderate vacuum the complete removal of the impurities would require an excessively long period of time. Therefore, the removal of the impurities from the regenerator within a certain period of time, determined by the time periods of the change-over, is only a matter of expenditure. The figures and values given hereinabove relate to a process which insures the best possible utilization, or recovery, respectively, of the high-boiling impurities at the lowest possible expenditure.

I claim:

1. In a process for the separation of high boiling constituents from non-condensable gases in a gas mixture containing high boiling constituents and non-condensable gases, by cooling to low temperatures in cyclical alternated regenerators to condense the high-boiling constituents, the method which comprises leading a compressed gas mixture through a first regenerator from the warm end to the cold end of the same to cool the gas mixture and to condense the high-boiling constituents of the gas mixture thereby leaving non-condensable gases, expanding the non-condensable gases work performingly and then dividing the expanded gases into two parts, the first part of the divided non-condensable gases expanding further in an expansion valve and leading it as a scavenging gas through a second regenerator from the cold end to the warm end of the same to clean the second regenerator and to re-evaporate high boiling constituents, maintaining a sublimation ratio of from 0.8 to 1.4 and an intermediate temperature difference less than 2° C. between the gas mixture flowing through the first regenerator and the scavenging gas flowing through the second regenerator, and leading the second part of the divided non-condensable gases through a third regenerator from the cold end to the warm end of the same to re-cool said third regenerator to the temperature of the first regenerator.

2. The process defined in claim 1, in which the relation of the pressures in the first regenerator and in the second regenerator is between about 8:1.

3. In a cyclical process for the operation of regenerators in a plant for the separation of gas mixtures by cooling to low temperatures and fractionating, the method which consists essentially in the following sequence of step: a first period of leading a gas mixture through a regenerator from the warm end to the cold end of the same to cool the gas mixture and to load said regenerator with condensate; a second period of leading a scavenging gas through said regenerator from the cold end to the warm end of the same to remove the main part of the condensate, maintaining in said second period a sublimation ratio of from 0.8 to 1.4, an intermediate temperature difference less than 2° C. and a pressure relation of about 8:1 between the pressure of the gas mixture flowing through the regenerator in the first period and the pressure of the scavenging gas flowing through the regenerator in the second period; and a third period of leading a cold gas through said regenerator from the cold end to the warm end of the same to recool the regenerator.

References Cited in the file of this patent

UNITED STATES PATENTS

| | | |
|---|---|---|
| 2,071,763 | Pollitzer | Feb. 23, 1937 |
| 2,534,478 | Roberts | Dec. 19, 1950 |
| 2,690,655 | Etienne | Oct. 5, 1954 |
| 2,863,294 | Zenner | Dec. 9, 1958 |

OTHER REFERENCES

"The Separation of Gases," (Ruhemann), published by Oxford University Press (London), second edition, 1949, pages 86 to 88 relied on.